April 22, 1930.  A. E. OSBORN  1,755,305
AUTOMATIC SLACK ADJUSTER
Filed Oct. 4, 1923
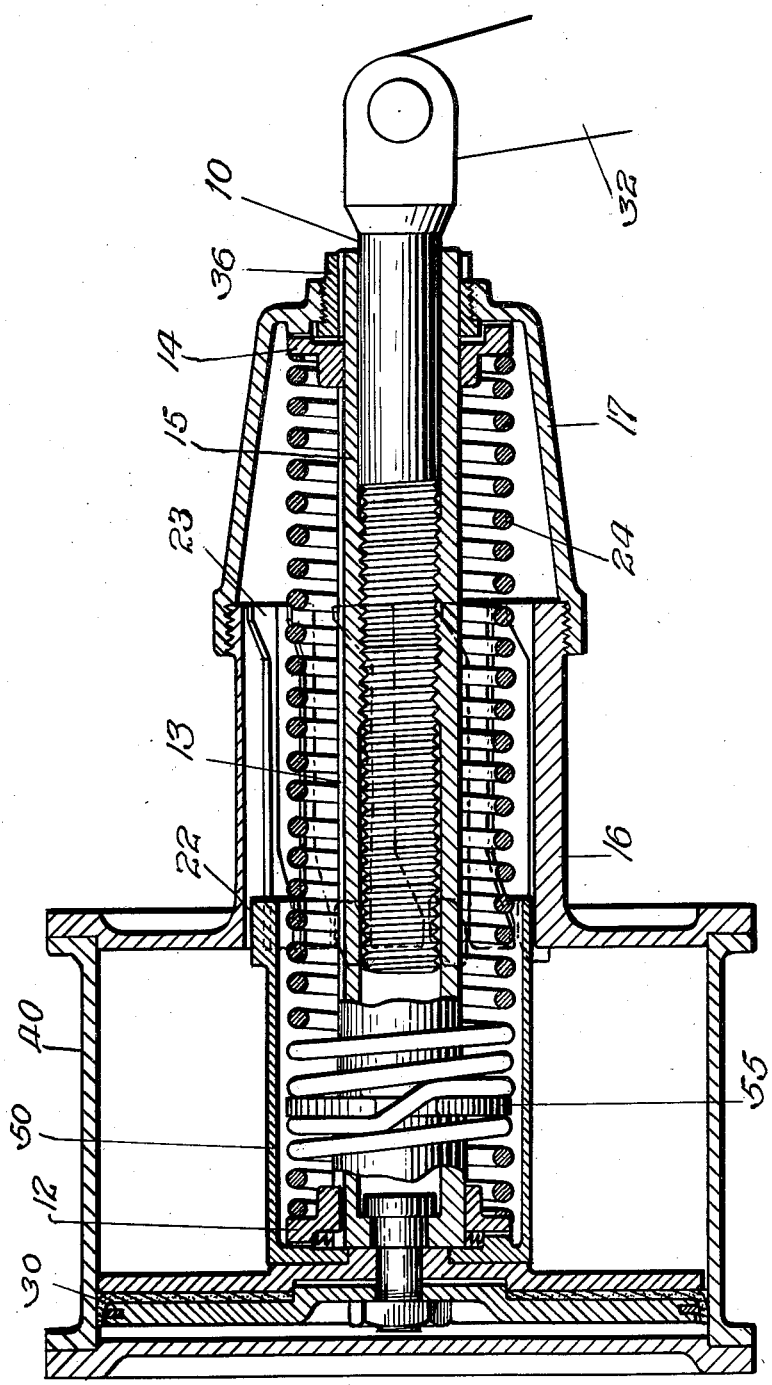
INVENTOR.
Alden E. Osborn.

Patented Apr. 22, 1930

1,755,305

UNITED STATES PATENT OFFICE

ALDEN E. OSBORN, OF NEW YORK, N. Y.

AUTOMATIC SLACK ADJUSTER

Application filed October 4, 1923. Serial No. 666,629.

This invention relates to certain modifications and improvements in the automatically adjusting turnbuckle shown in my Patent No. 1,477,891 of December 18, 1923, and in the automatic slack adjuster shown in my Patent No. 1,510,101 of September 30, 1924, and in my application Serial No. 657,362, filed Aug. 14, 1923, whereby the device is greatly simplified thru the use of the slack adjuster spring to release the pressure on the brake shoes and return the parts to their normal position, thus eliminating a separate spring for the purpose. It also involves certain improvements in the arrangement of the adjuster whereby it presents a neater appearance and is more fully protected from water and dirt and in the particular form to which this invention relates, which is especially suitable for use in connection with air brake cylinder, these results are obtained by placing the mechanism within the brake cylinder. It should be understood that various modifications may be made in the device and that it may be applied in a great many different ways without departure from the true spirit and scope of the invention as defined in the claims.

In the accompanying drawing is shown a longitudinal sectional view of my invention.

In this drawing 10 indicates the adjustable member or piston rod extension which is attached at one end to the lever 32, and is connected on the other end to the brake piston 30 within the cylinder 40 thru the slack adjuster so that it can be moved by that adjuster in relation to the brake piston. The extension rod is threaded on its exterior which thread engages a thread on the interior of the hollow piston rod or adjusting element 15 that is provided with keys which engage keyways on the interior of the ratchet discs 12 and 14. The ratchet disc 14 engages teeth on the interior of the cylinder cover 17, while the ratchet disc 12 engages teeth on the interior of the collar 50 which collar is free to turn about the exterior of a hub on the piston 30 and is provided with keys 22 that engage keys 23 on the cylinder extension 16. These keys are shown as being straight for a greater part of their length and have spiral or slanting portions at each end, so that when the collar 50 is moved along, by the motion of the piston 30, it would not turn until near the end of the piston stroke when it would be rotated by the keys 22 coming into mesh with the outer spiral portion of the keys 23. In order to keep the ratchet teeth in engagement, return the parts to their normal position and release the brakes a spring 24 is arranged between the ratchet discs 12 and 14. The operation of this device is as follows:

When the air is admitted to the brake cylinder and the brake piston forced outward by the piston 30 no movement is given to the adjuster parts unless the piston reaches a point where the keys 22 on the outer collar 50 engage the spiral parts of the keys 23, when the collar 50 would be rotated in the opposite direction to that in which the hollow piston rod 15 would be turned in order to make the automatic adjustment of the piston rod extension 10. If this movement of the collar 50 was sufficient to cause a new set of ratchet teeth between it and the disc 12 to be engaged, the return of the parts, upon the release of the air pressure, would cause the collar to be turned, by the action of the spiral surfaces at the inner end of the keys 23, in the opposite direction, or in a direction in which it is desired to turn the hollow piston rod 15, with the result that the rod 15 is rotated and the piston rod extension moved in relation to the piston. This rotation in a direction to tighten the adjustment is permitted by the ratchet teeth between the disc 14 and cover 17, but in cases where there is no tendency for the hollow piston rod to turn backward these parts can be omitted. In order to release the adjustment to turn the hollow piston rod 15 backward, when this ratchet is fitted, it is necessary to disengage these ratchet teeth and I have shown a threaded bushing 36 in the cover 17 so arranged that it can be rotated back against the ratchet disc 14 and push that disc out of engagement with the teeth of the cover 17, thus allowing the hollow piston rod 15 to be turned in a backward direction.

The special form of keys with slanting or spiral ends is preferred in place of the ordinary spiral key system usually employed to transmit a sliding or reciprocating motion of the collar or sleeve to another part to give that part an oscillatory motion, because, when the usual spiral key system is used, the barrel 50 would rotate from the start of the outward stroke of the piston and would subject the ratchet teeth between the ratchet disc 12 and the barrel 16 to more wear, as motion would take place between the parts even tho there is not sufficient wear on the brakes to make an adjustment. It will be noticed that if the pressure of the spring 24 were allowed to come directly on the ratchet teeth between the ratchet disc 12 and collar 50 they would be subject to considerable wear, and in order to prevent this wear I have inserted a washer 55 on the hollow piston rod 15 against a shoulder on that rod so that it takes the main thrust pressure of the spring 24 which is shown as passing thru a notch in washer and having its end which extends beyond the washer arranged to press against the disc 12 with a light pressure that does not change with any position of the brake piston. It will also be noticed that the collar 50 would be rotated backward to bring new ratchet teeth between it and the disc 12 into engagement when it reaches the adjusting point at the outer end of the stroke and nothing is moved again, to actually make the adjustment, until the piston is near the inner end of its stroke when the keys 22 again come into contact with the other spiral part of the keys 23, and the collar is turned to rotate the hollow piston rod 15.

Having thus described my invention I claim as new and desire to secure by Letters Patent:—

1. In an automatic slack adjuster the combination of a brake cylinder, a piston in said cylinder, a piston rod actuated by said piston and rotatably connected thereto, an adjustable member extending outside of said cylinder and connecting said piston rod with the parts to be operated by the movement of said piston, said adjustable member and said piston rod being threaded together, a ratchet disc slidably mounted on said piston rod, a collar rotatable about said rod and having teeth engaging teeth on said ratchet disc, and means whereby said collar is rotated, upon said piston exceeding a certain pre-determined amount of travel, to cause the rotation of said piston rod, thru the locking of said ratchet teeth during the return of said parts to their normal position, to adjust the relation of said piston to said brake operating connection.

2. In an automatic slack adjuster the combination of a brake cylinder, a piston in said cylinder, a piston rod actuated by said piston and rotatably connected thereto, an adjustable member extending outside of said cylinder and connecting said piston rod with the parts to be operated by the movement of said piston, said adjustable member and said piston rod being threaded together, a ratchet disc slidably mounted on said piston rod, a collar rotatable about said piston rod and having teeth engaging teeth on said ratchet disc, a spring to return said piston to its normal position upon the release of the operating pressure from said cylinder, and a key on the exterior of said collar, a stationary member, a key on said stationary member and co-acting with said key on said collar and having its outer end arranged spirally to cause the rotation of said collar to engage the ratchet teeth in a new relation and to, during the return of said parts to their normal position thru the locking of said ratchet teeth, rotate said piston rod also, to adjust the relation of said piston to said brake operating connection.

3. In an automatic slack adjuster the combination of a brake cylinder, a piston in said cylinder, a piston rod actuated by said piston and rotatably connected thereto, an adjustable member extending outside of said cylinder and connecting said piston rod with the parts to be operated by the movement of said piston, said adjustable member and said piston rod being threaded together, a ratchet disc slidably mounted on said piston rod, a collar rotatable about said piston rod and engaging teeth on said ratchet disc, a spring to return said piston to its normal position upon the release of the operating pressure from said cylinder, and means whereby the collar is rotated upon said piston exceeding a certain pre-determined amount of travel to cause the rotation, thru the locking of said ratchet teeth of said piston rod to adjust the relation of said piston rod to said brake operating connection.

4. In an automatic slack adjuster the combination of a brake cylinder, a piston in said cylinder, a piston rod actuated by said piston and rotatably connected thereto, an adjustable member extending outside of said cylinder and connecting said piston rod with the parts to be operated by the movement of said piston, said adjustable member and said piston rod being threaded together, a ratchet disc slidably mounted on said piston rod, a collar rotatable about said rod and having ratchet teeth engaging teeth on said ratchet disc, a spring to return said piston to its normal position upon the release of the operating pressure thereon, a key on the exterior of said collar, a stationary member, a key on the stationary member and co-acting with said collar key and having its outer end arranged spirally to cause the rotation of said collar in a reverse direction to the rotation of said piston rod to make the adjustment and to adjust the relation of said piston to said brake lever upon the return, by said spring, of said parts to their normal position rotating said collar, thru the action of said spiral keys, said rotation being transmitted to said piston rod by the locking of said ratchet teeth between said collar and said ratchet disc.

5. In an automatic slack adjuster the combination of a brake cylinder, a piston in said cylinder, a piston rod actuated by said piston and rotatably connected thereto, an adjustable member extending outside of said cylinder and connecting said piston rod with the parts to be operated by the movement of said piston, said adjustable member and said piston rod being threaded together, a ratchet disc slidably mounted on said piston rod, a collar rotatable about said rod and having ratchet teeth engaging teeth on said ratchet disc, a spring to return said piston to its normal position upon the release of the operating pressure thereon, a key on the exterior of said collar, a stationary member, a key on the stationary member and co-acting with said collar key and having its outer end arranged spirally to cause the rotation of said collar in a reverse direction to the rotation of said piston rod to make the adjustment and having its inner end arranged spirally to rotate said collar, upon the return by said spring of said parts to their normal position, in a direction to adjust the relation of said piston and said brake lever, said rotation of said collar being transmitted to said piston rod by the locking of the ratchet teeth between said collar and the ratchet disc.

6. In a slack adjuster the combination of an adjusting member, a ratchet disc slidably mounted on said member, a longitudinally slidable member, and spring for returning said longitudinally slidable member to its normal position and for engaging the teeth on said ratchet disc with the teeth of its co-acting part, and means for causing said spring to act upon said ratchet disc with less pressure than upon said slidable member, comprising a washer engaging a large part of said member and acting as an abutment for the main part of said spring and separating said part from a secondary part acting against said disc.

7. In an automatic slack adjuster the combination of a longitudinally movable rotatable adjusting element, an adjustable member connecting said adjusting element with the parts to be operated by the longitudinal movement thereof, said adjustable member and said adjusting element being threaded together, a longitudinally slidable member, a spring for returning said slidable member to its normal position, a collar movable about said spring, a ratchet means acting on said collar to allow its free movement in one direction and to prevent its free movement in the other direction, a spiral key system operatable by the movement of said longitudinally slidable member comprising a beveled surface acting at one point in the travel of said longitudinally slidable member against the action of said spring to move said collar about said spring in a direction to release said ratchet means and to cause said ratchet means to engage in a new relation, and a second oppositely acting beveled surface to, during the return of said longitudinally slidable member to its normal position by the action of said spring, cause the rotation, thru the locking of said ratchet means, of said adjusting element and the movement of said adjustable member, thru the turning of said thread between said adjustable member and said adjusting element in relation to said adjusting element.

8. In an automatic slack adjuster the combination of a longitudinally movable rotatable adjusting element, an adjustable member connecting said adjusting element with the parts to be operated by the longitudinal movement thereof, said adjustable member and said adjusting element being threaded together, a longitudinally slidable member, a spring for returning said slidable member to its normal position, a movable collar, a ratchet means acting on said collar to allow its free movement in one direction and to prevent its free movement in the other direction, a spiral key system operatable by the movement of said longitudinally slidable member comprising a plurality of keys and a plurality of co-acting key-engaging members, said keys having beveled surfaces acting against said key engaging members at one point in the travel of said longitudinally slidable member against the action of said spring, to move said collar in a direction to release said ratchet means and to cause said ratchet means to engage in a new relation, and having second oppositely acting beveled surfaces acting against said key-engaging members to, during the return of said longitudinally slidable member to its normal position by the action of said spring, cause the rotation, thru the locking of said ratchet means, of said adjusting element and the movement of said adjustable member in relation to said adjusting element thru the turning of said thread between said adjustable member and said adjusting element.

9. In an automatic slack adjuster the combination of a cylinder, a piston longitudinally slidable in said cylinder, a spring from returning said piston to its normal position, a rotatable adjusting element connected to said piston and longitudinally movable therewith, an adjustable member connecting said adjusting element with the parts to be operated by the longitudinal movement thereof, said adjustable member and said adjusting element being threaded together, a movable collar, within said cylinder, a ratchet means within the cylinder acting on said collar to allow its free movement in one direction, and to prevent its free movement in the other direction, a spiral key system within the cylinder and operated by the movement of said piston comprising a beveled surface acting at one point in the travel of said piston against the action of said spring, to move said collar in a direction to release said ratchet means and to cause said ratchet teeth to engage in a new relation, and a second oppositely acting beveled surface to, during the return of said piston to its normal position under the action of said spring, cause the rotation, thru the locking of said ratchet means, of said adjusting element and the movement of said adjustable member in relation to said adjusting element thru the turning of said thread between said adjustable member and said adjusting element.

10. In an automatic slack adjuster the combination of a cylinder, a piston longitudinally slidable in said cylinder, a spring for returning said piston to its normal position, a rotable adjusting element connected to said piston and longitudinally movable therewith, an adjustable member connecting said adjusting element with the parts to be operated by the longitudinal movement thereof, said adjustable member and said adjusting element being threaded together, a collar within said cylinder and movable about said spring, a ratchet means within said cylinder acting on said collar to allow its free movement in one direction and prevent its free movement in the other direction, a spiral key system within the cylinder and operated by the movement of said piston comprising a plurality of keys and a plurality of co-acting key-engaging members, said keys having beveled surfaces acting against said key-engaging members at one point in the travel of said piston against the action of said spring, to move said collar in a direction to release said ratchet means and to cause said ratchet means to engage in a new relation, and having second oppositely acting beveled surfaces acting against said key-engaging members to, during the return of said piston to its normal position by the action of said spring, cause the rotation, thru the locking of said ratchet means, of said adjusting element and the movement of said adjustable member in relation to said adjusting element thru the turning of said thread between said adjustable member and said adjusting element.

In witness whereof, I have hereunto set my hand this 2nd day of October, 1923.

ALDEN E. OSBORN.